United States Patent Office.

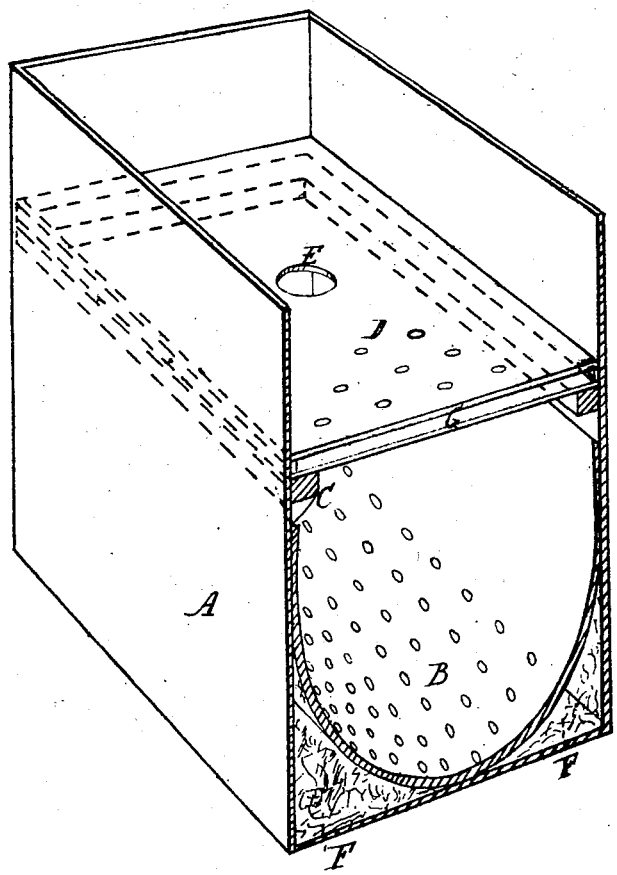

JASON CRANE, OF BLOOMFIELD, NEW JERSEY.

Letters Patent No. 92,274, dated July 6, 1869.

IMPROVEMENT IN PRESERVING FURS, CLOTHES, AND THE LIKE ARTICLES, FROM INJURY BY MOTHS, &c.

The Schedule referred to in these Letters Patent and making part of the same.

*To all whom it may concern:*

Be it known that I, JASON CRANE, of Bloomfield, in the county of Essex, and State of New Jersey, have invented certain new and useful Improvement in Preserving Furs, Cloth, and other Articles; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

This invention relates to the preserving of furs, cloths, and other articles liable to be destroyed by moths or other insects; and It consists in forming the box, case, or other receptacle used for holding or storing such articles in the ordinary manner, and filling any vacant spaces which may exist, or which may be formed for the purpose, with cedar shavings, cedar sawdust, or with other aromatic wood which possesses the property of repelling or destroying moths and other insects. Either with these wood shavings or without them, other preservative compositions may be used, such as camphor, carbolic acid, the various aromatic and essential oils, and the like.

This invention is especially applicable to packing-boxes for furs, shawls, cloths, and other similar articles.

In the annexed drawing is shown my invention as applied to a fur-set box.

The spaces F, between the walls A and the muff-cylinder B C, are to be filled with cedar shavings or other preservative agent.

A series of small holes should be formed, as shown, so as to connect the spaces F and G, containing preservative material, with the spaces that are to contain the furs or other article to be preserved.

In a fur-set box, such as shown, the spaces F are ordinarily formed and left vacant. They serve, in my invention, to contain the preservative material; but in boxes for other similar purposes, spaces may be formed expressly for this purpose. They may be formed in the corners of the box, or by means of a double partition, as shown at G, or otherwise, as found most convenient in arranging the space within the box, so as to contain the article. There are ordinarily such vacant spaces ready formed to receive the cedar shavings, sawdust, or like material.

I am aware that a veneer or lining of cedar is well known in forming boxes, trunks, and the like. This I do not claim. Nor do I limit myself to the particular arrangement of spaces within the box to contain the preservative agent, as these may be greatly varied without departing from the nature of my invention; but having described my invention,

What I claim, and desire to secure by Letters Patent of the United States, is—

The herein-described mode of preserving furs, cloths, and other articles, the same consisting in filling suitably-formed spaces within boxes or packing-cases, with cedar shavings, cedar sawdust, or other equivalent preservative material, substantially as herein described.

Also, the new article of manufacture, boxes for preserving furs, clothes, and the like, having spaces for preservative agents, substantially as described.

JASON CRANE.

Witnesses:
JAS. H. McMAHON,
JNO. REIDENBACH.